Nov. 6, 1923.
1,472,993
L. G. SABBAG ET AL
BRAKE AND GAS CONTROL FOR SELF PROPELLED VEHICLES
Filed Sept. 27, 1921
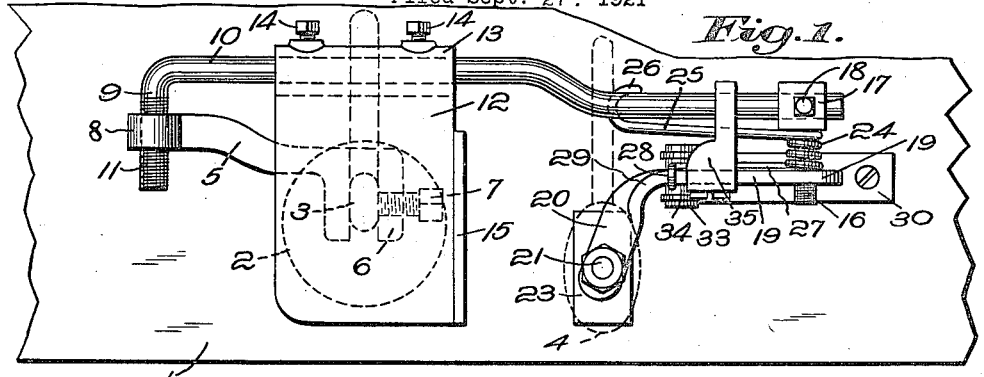
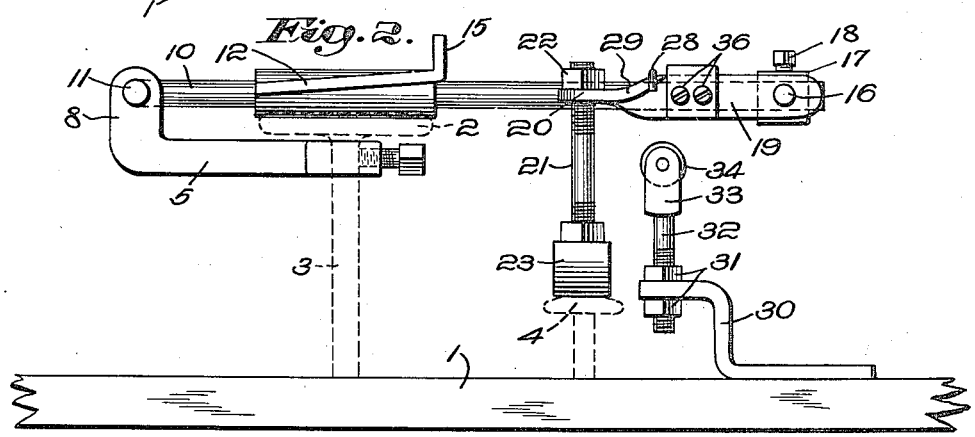
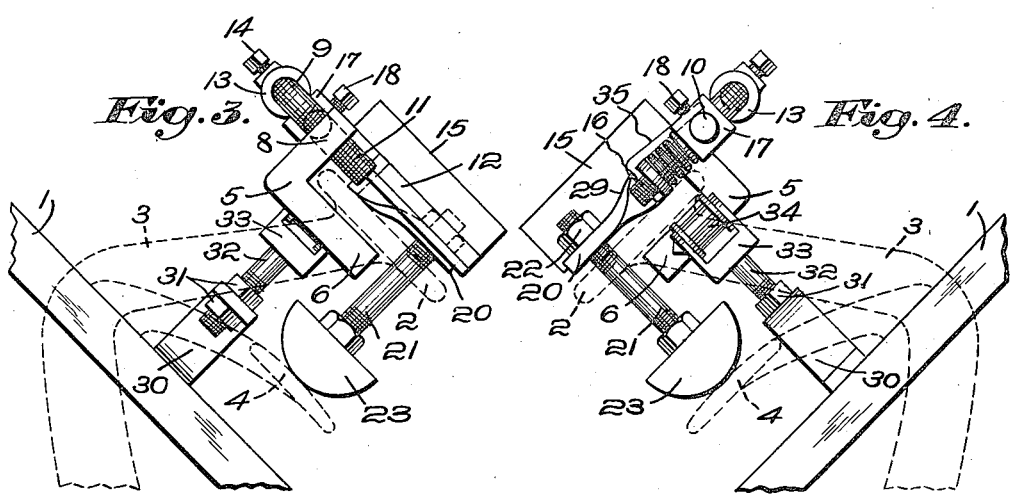
Inventor:
Lutfallah G. Sabbag,
Ray Anton,
by Emery, Booth, Janney & Varney
Attys.

Patented Nov. 6, 1923.

1,472,993

UNITED STATES PATENT OFFICE.

LITFALLAH G. SABBAG, OF EAST BOSTON, MASSACHUSETTS, AND RAY ANTON, OF DOVER, NEW HAMPSHIRE; SAID SABBAG ASSIGNOR TO SAID ANTON.

BRAKE AND GAS CONTROL FOR SELF-PROPELLED VEHICLES.

Application filed September 27, 1921. Serial No. 503,676.

*To all whom it may concern:*

Be it known that we, LITFALLAH G. SABBAG and RAY ANTON, citizens of the United States, and residents of East Boston, in the county of Suffolk and State of Massachusetts, and Dover, in the county of Strafford and State of New Hampshire, respectively, have invented an Improvement in Brake and Gas Controls for Self-Propelled Vehicles, of which the following description, in connection with the accompanying drawings, is a specification, like characters on the drawings representing like parts.

This invention relates to combined brake and gas control for automobiles or other self-propelled vehicles. In order that the principle of the invention may readily be understood we have disclosed a single embodiment thereof in the accompanying drawings wherein:

Fig. 1 is a plan view of one embodiment of our invention;

Fig. 2 is a front elevation thereof;

Fig. 3 is a side elevation thereof viewed from the left in Fig. 1; and

Fig. 4 is a side elevation thereof viewed from the right.

In many types of cars at the present time the controls are so arranged that one foot (usually the left) controls the clutch and the other foot (usually the right) controls both the brake and the gas or gasoline supply to the carburetor. So far as we are aware the brake and gas controls have been so located that it is necessary to shift the foot from one to the other. This is objectionable for many reasons, although with practice the driver tends instinctively to move his foot from one control to the other with great accuracy. Nevertheless, many accidents have occurred because of the necessity of shifting the foot from one of said controls to the other.

An important object of our invention therefore is to provide means whereby two controls—in the present instance the brake and the gas control, may be made to function without shifting the foot from one to the other. While we will refer to the brake and to the accelerator, or gas control, it is to be understood that the invention is not limited in its broadest aspect to the functioning of the said two controls, as within the scope of our invention it may otherwise be applied, as for example in certain cases to govern the brake and the clutch, or the gas and the clutch. We will, however, describe that preferred or illustrative embodiment of our invention wherein the brake and accelerator are governed by a control without shifting movement of the foot.

Referring more particularly to the drawings, the inclined floor board of the car is indicated at 1 in the several figures, the brake pedal is indicated at 2 and the rod connecting the brake pedal and the brake is indicated at 3. The accelerator is indicated at 4. The said parts are represented in their accustomed relation in numerous types of cars, such for example as the Cadillac.

We provide a part or member 5 which may be a casting having a yoke-like end 6 adapted to fit about the rod of the brake pedal and to be fixedly secured thereto by a set screw 7, or in any other suitable manner. The member 5 desirably has an upstanding end 8, provided with a transverse opening therein for the reception of a bent end 9, which provides a fulcruming point, of a rod 10. The said rod 10 is threaded as indicated at 11 to permit transverse adjustment, a nut being provided to hold the parts in proper position if desired.

The rod 10 extends transversely of the floor board, as most clearly indicated in Figures 1 and 2, in a position parallel thereto and extends past both the brake 2 and the accelerator 4. Desirably upon a part of the rod 10 in front of the pedal 2 we secure a foot plate 12 having a hub 13 through which the said rod 10 passes, set screws 14 being provided so as to rigidly secure the foot plate and the rod 10 in fixed relation with said foot brake overlying the brake pedal 2 and spaced therefrom a sufficient distance, such for example as half an inch or more. Desirably the foot plate 12 is provided with an upstanding flange 15 to aid in positioning the foot.

Obviously in place of the foot plate 12 any suitable extension of the rod 10 may be provided, or in cases where the rod 10 is replaced by a member of other form, the foot plate 12 may be replaced by some suitable part of such member.

The rod 10 is of suitable length, and at a point desirably beyond the accelerator 4 it receives a horizontally positioned pin 16, said pin having a hub or hollow head 17 permitting the pin to be fitted into place upon said rod where it is fixedly held by a set screw 18.

Loosely mounted upon the said pin 16 at a point suitably spaced from the head 17 is an arm 19 which in the embodiment of the invention shown is somewhat bent and extends to a position directly over the accelerator 4, it occupying a position considerably above the same, as shown in Fig. 2. Near the end of the bent part 20 of said arm 19 an opening is provided for the reception of a vertical or depending bolt 21, suitably threaded for the reception of a nut 22. To the lower end of said bolt 21 is secured a head 23 adapted to rest lightly upon the accelerator 4 as clearly indicated in the several figures.

Surrounding the pin 16 between the hub thereof and the arm 19 is provided a coil spring 24, said spring having an elongated end portion 25 terminating in a hook or bend 26 underlying the rod 10. The other end of the coil spring 24 is also extended as indicated at 27 and the extreme end 28 thereof overlies the arm 19, which as most clearly shown in Fig. 2 is provided with a lip or flange 29.

Secured to the floor board is a suitable bracket 30, and in an opening therein is secured by suitable nuts 31 an upright pin or bolt 32 having a head 33 and, if desired, a roll 34 constituting a stop.

The parts normally occupy the position indicated in Fig. 2, the foot plate 12 being above the brake pedal 2 and the arm 19 lying in a position parallel with the rod 10 and above the stop 32, 33, 34.

In order to preserve the parallelism of the rod 10 and the arm 19 at certain times and also to elevate the arm 19 when it has been pressed, we provide a cross member or bracket 35 which is secured by bolts 36 to the arm 19, said cross member or bracket being of sufficient length to overlie the rod 10.

The foot of the operator (customarily the right foot) rests lightly upon the foot plate 12 which, as stated, is positioned above the brake pedal 2. If now it be desired to increase the supply of gas,—that is to say, to depress the accelerator 4—the foot which is resting upon the foot plate 12 is depressed so as to move the rod 10 downwardly. The head 23 which is resting lightly upon the accelerator 4 acts to depress the accelerator and to supply more gas. The downward movement of the rod 10 causes said rod to rock upon the bent end 9 thereof, but the foot plate 12 is not brought into contact with the brake pedal 2 until after the accelerator 4 has been depressed to the full or desired extent. Continued downward movement of the plate 12, if it be desired now to apply the brake, results in bringing the foot plate 12 into engagement with the brake pedal 2 and continued foot pressure causes the foot plate 12 with the rod 10 and the brake pedal 2 to move downwardly together. This downward movement brings the arm 19 into contact with the fixed stop 34 so that further application of pressure to the accelerator 4 is prevented. The spring 24 normally tends to move the arm 19 downwardly but with insufficient force of itself to depress the accelerator 4. As soon as the arm 19 comes in contact with the stop 34 further downward movement of the arm 19 is arrested, but the downward movement of the rod 10 continues and the brake is applied to the extent desired. When the brake is to be released the foot is elevated or the pressure thereon is released and the brake pedal 2 at once moves upwardly, the rod 10 with the bracket 5 rising until the parts assume the position shown in Fig. 2. The arm 19 which has been resting upon the fixed stop 34 is lifted therefrom by reason of the engagement of the cross piece or bracket 35 with the rod 10, the arm 19 and the rod 10 then rising together in a parallel relation.

The stop 32, 33, 34 can be vertically adjusted or set at the desired point and so that with the downward depression of the foot plate 12 and the rod 10 the arm 19 may come into contact with the said stop at exactly the right time and prevent the flow of more gas when the same is not desired or when it is desired to apply the brake. With the parts positioned as shown in Fig. 2 it is evident that the first part of the downward movement of the foot plate 12 and rod 10 depresses the accelerator so as to supply more gas, but said foot brake 12 comes quickly into engagement with the brake pedal 2 and thereupon the brake is applied. Furthermore, continued downward pressure upon the foot plate 12 then results in lifting the head 23 from the accelerator 4, since the arm 19 has been brought against the fixed stop 32, 33, 34. It will be evident that if now it is desired to release the brake and to apply more gas the pressure upon the foot plate 12 is diminished so that the foot plate with the rod 12 rise but the arm 19 decends.

It is pointed out that it is customary for the driver to throw out the clutch at the same time the brake is applied so that even though at times a slight additional supply of gas may be furnished when first depressing the brake pedal this is immaterial because the clutch is thrown out.

If it be desired to throw out of temporary action the construction herein described, this can be done by swinging upwardly the rod 10 and parts carried thereby upon the bent end 9 of the fulcrum. If said parts be swung past the vertical, the brake pedal and accelerator are left exposed to be operated in the customary manner.

Having thus described one illustrative embodiment of our invention we desire it to be understood that although specific terms are employed they are used in a generic and descriptive sense and not for purposes of limitation, the scope of the invention being set forth in the following claims:

1. An automobile having a brake pedal and an accelerator and a member secured to the stem of the brake pedal and overlying both the brake pedal and the accelerator and having a part adapted to engage said accelerator, said member being adapted to be depressed by foot pressure.

2. In an automobile having a foot brake and an accelerator, a member adapted to be detachably secured to one of said parts and to be normally positioned over both of said parts and to be depressed by foot pressure into engagement with either or both of said controls.

3. In an automobile having a foot brake and an accelerator, an attachment for the combined control of the brake pedal and the accelerator, comprising a member attached to the brake pedal and overlying both the brake pedal and the accelerator, said member having a part adapted to receive the foot pressure in a single vertical path, whereby either of said controls may be operated by foot pressure and without lateral shifting of the foot.

4. In an automobile provided with a brake and an accelerator, an attachment for the combined control of the brake and the accelerator adapted to be secured to one of them and to overlie both of them, said attachment having a vertically movable part provided with a foot plate overlying the brake and to which foot plate pressure may be applied without shifting movement to operate either the brake or the accelerator.

5. In an automobile provided with a brake and an accelerator, an attachment for the combined control of the brake and the accelerator adapted to be secured to one of them and to overlie both of them, said attachment having a vertically movable part provided with a foot plate overlying the brake and to which foot plate pressure may be applied without shifting movement to operate either the brake or the accelerator, and a stop positioned in operative relation to the accelerator and adapted to be impinged upon by the attachment to control the extended engagement of the attachment with the accelerator.

6. In an automobile having a brake pedal and an accelerator, an attachment adapted to be secured to the stem of the brake pedal and including a vertically swinging member, a foot plate attached thereto and overlying the brake pedal, and an arm having capacity for movement relative to the other parts of the attachment, and a stop cooperating with said arm.

7. In an automobile having a foot brake and an accelerator, a bracket adapted to be detachably secured to the stem of the foot brake, a rod pivotally carried by said bracket, an arm having yielding relation with respect to said rod, the part carried by said arm adapted to engage the accelerator, and a foot plate carried by the rod and overlying the brake pedal.

8. In an automobile having a foot brake and an accelerator, a bracket adapted to be detachably secured to the stem of the foot brake, a rod pivotally carried by said bracket, an arm having yielding relation with respect to said rod, the part carried by said arm adapted to engage the accelerator, a foot plate carried by the rod and overlying the brake pedal, and a fixed stop adapted to be impinged upon by said arm in the downward movement thereof.

9. In an automobile having a foot brake and an accelerator, a bracket rigid with the brake pedal, a rod pivotally carried by said bracket and having an extension overlying the brake pedal, a spring-controlled arm pivotally carried by said rod and having a downwardly extending member adapted to engage the accelerator.

10. In an automobile having a foot brake and an accelerator, a bracket rigid with the brake pedal, a rod pivotally carried by said bracket and having an extension overlying the brake pedal, a spring-controlled arm pivotally carried by said rod and having a downwardly extending member adapted to engage the accelerator, and a stop positioned in proximity to the accelerator and adapted to be engaged by said arm in the downward movement of the latter.

11. Combined means for interchangeably operating the brake and the gas controls of automobiles or other self-propelled vehicles comprising a removable attachment adapted to be carried by one of said controls and overlying both of them, and having a part adapted to be pressed by the foot at a single position to operate the brake or the gas control dependent upon the extent of downward movement of the foot.

12. In an automobile having a brake pedal and an accelerator, an attachment secured to the stem of the brake pedal and having a member overlying both the brake pedal and the accelerator and adapted to be engaged by the foot when in one position and to be operated by a downward pressure of the foot to act upon either the brake or the accelerator.

13. In an automobile having a brake pedal and an accelerator, an attachment secured to the stem of the brake pedal and having a member overlying both the brake pedal and the accelerator and adapted to be engaged by the foot when in one position and to be operated by a downward pressure of the foot to act upon either the brake or the accelerator, said member being adapted to be moved into position to expose both the foot brake and the accelerator for customary action, without detachment from said bracket.

In testimony whereof, we have signed our names to this specification.

LITFALLAH G. SABBAG.
RAY ANTON.